United States Patent [19]

Mori

[11] Patent Number: 4,908,913

[45] Date of Patent: Mar. 20, 1990

[54] SAFETY HOOK

[75] Inventor: Tomohiro Mori, Uozu, Japan

[73] Assignee: Yoshida Kogyo K.K., Tokyo, Japan

[21] Appl. No.: 387,989

[22] Filed: Aug. 1, 1989

[51] Int. Cl.⁴ .............................................. A44B 13/02
[52] U.S. Cl. ...................................... 24/233; 24/236; 24/241 PS
[58] Field of Search ................. 24/233, 234, 235, 236, 24/241 R, 241 PP, 241 P, 241 PS, 241 PL

[56] References Cited

U.S. PATENT DOCUMENTS

| | | | |
|---|---|---|---|
| 40,486 | 11/1863 | Jones | 24/233 |
| 380,286 | 3/1888 | Humphreys | 24/234 |
| 533,907 | 2/1895 | Maloney | 24/233 |
| 731,162 | 6/1903 | Carter | 24/241 PS |
| 1,032,369 | 7/1912 | Baxter | 24/233 |
| 2,277,183 | 3/1942 | Reynolds | 24/235 |
| 4,665,592 | 5/1987 | Kasai | 24/236 |

FOREIGN PATENT DOCUMENTS 1368427 9/1974 United Kingdom .

Primary Examiner—Victor N. Sakran
Attorney, Agent, or Firm—Hill, Van Santen, Steadman & Simpson

[57] ABSTRACT

A safety hook includes a generally R-shaped latch member pivotally mounted on a hook member for opening and closing a mouth of the hook member. The R-shaped latch member includes a ring-shaped head having a pair of spaced resilient support lugs on which pivot pins are formed. The head of the latch member is movably received in a recess in the hook member and the pivot pins are snap-fitted in opening in the hook member. The safety hook can be easily assembled only by forcing the latch member into the recess in the hook member. Once the hook member and the latch member are assembled, they are retained in assembled condition against detachment even when a severe thrusting force is applied onto the locking arm of the latch member.

7 Claims, 4 Drawing Sheets

SAFETY HOOK

BACKGROUND OF THE INVENTION

1. Field of the Invention

The present invention relates to a safety hook composed of two members which can be easily assembled together.

2. Description of the Prior Art

An example of safety hooks composed of two parts that are assembled together is disclosed in British Pat. No. 1,368,427. The disclosed safety hook includes a hook member molded of synthetic resin and having a lug and pivot pins on opposite sides of the lug. The pivot pins are snap-fitted in recesses in a generally V-shaped stopper member which is formed integrally with a stopper arm and a leaf spring. The leaf spring acts on the hook member to resiliently urge the stopper member to pivot in a direction to close a gap or mouth of the hook member by the stopper arm.

The known safety hook of the foregoing construction is advantageous in that the hook member and the stopper member can be assembled together with utmost ease. However, since the recesses snap-fitted on the pivot pins have a generally C shape opening outwardly of the mouth of the hook member, the stopper member can readily be detached from the hook member when subjected to severe thrusting force or pressure.

SUMMARY OF THE INVENTION

With the foregoing drawback of the prior art in view, it is an object of the present invention to provide a safety hook composed of a hook member and a latch member which can be easily assembled together by a single step of operation and are firmly retained in an assembled condition once they are assembled together.

According to the present invention, a safety hook comprises a hook member having an enlarged head and a hook integral with and extending from the head so as to define therebetween a mouth. The enlarged head has a recess opening to the mouth and a pair of aligned holes communicating with the recess. A generally R-shaped latch member is pivotally mounted on the hook member and includes a rounded head movably received in the recess, a locking arm and a resilient arm which are integral with and extend outwardly from one side of the head in diverging fashion. The resilient arm acts on said hook member to urge the latch member in a closing position in which the locking arm closes the mouth. The head includes a pair of spaced resilient support lugs and a pair of aligned pivot pins integral with the respective support lugs. The pivot pins extend outwardly away from one another and are rotatably received in the holes, respectively.

According to a preferred embodiment, the pivot pins have a length smaller than the length of the holes so that they do not project to the outside of the hook member. The rounded head may be of a complete or closed ring shape or a split ring shape in which instance a resilient arm of the latch member is integral with and extends from one of opposite ends of the split ring-shaped head.

Many other advantages and features of the present invention will become manifest to these versed in the art upon making reference to the detailed description and the accompanying sheets of drawings in which preferred structural embodiments incorporating the principles of the present invention are shown by way of the illustrative example.

DETAILED DESCRIPTION OF THE PREFERRED EMBODIMENTS

Figure 1:
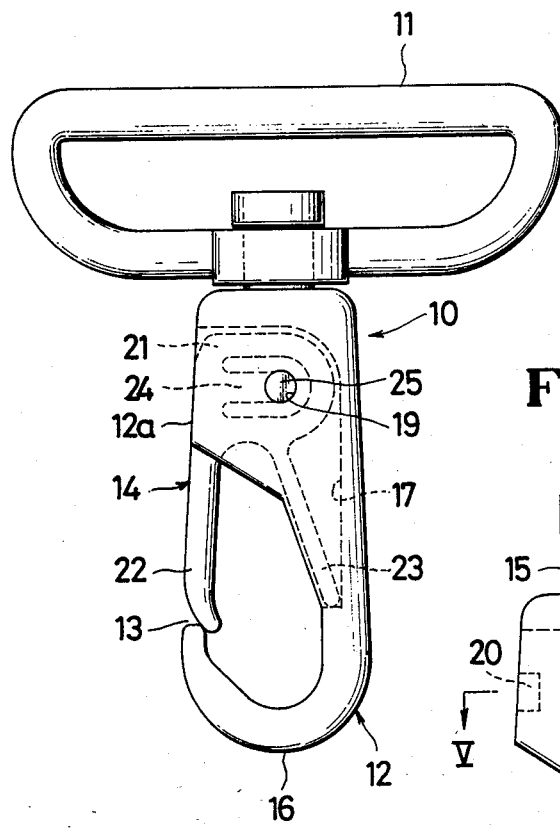
FIG. 1 is a front elevational view of a safety hook according to the present invention.

FIG. 1 shows a safety hook 10 according to the present invention. The safety hook 10 is rotatably connected to a link connector 11 for attachment to a belt or strap.

The safety hook 10 is composed of two parts, i.e. a hook member 12 and a latch member 14 pivotally connected to the hook member 12 for opening and closing a gap or mouth of the hook member 12.

Figure 2:
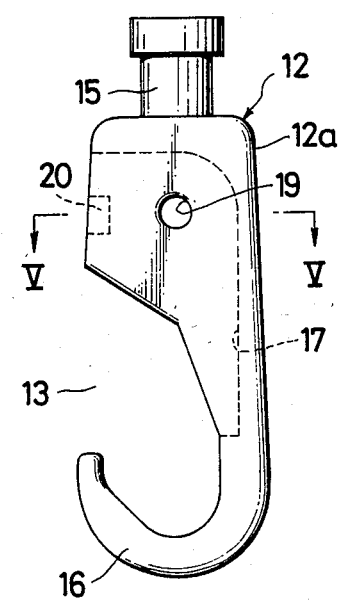
FIG. 2 is a front elevational view of a hook member of the safety hook.
Figure 3:
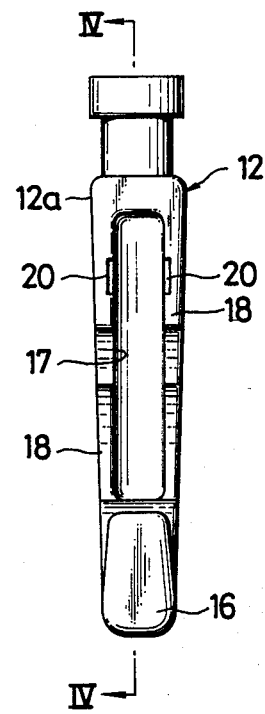
FIG. 3 is a left side view of FIG. 2.
Figure 4:
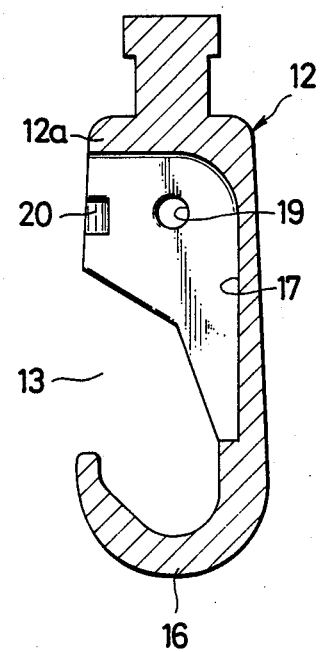
FIG. 4 is a cross-sectional view taken along line IV—IV of FIG. 3.
Figure 5:
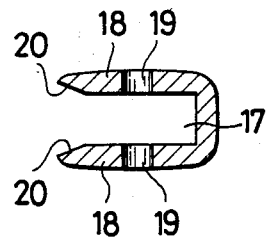
FIG. 5 is a cross-sectional view taken along line V—V of FIG. 2.

The hook member 12 is preferably made of metal because it can readily be colored to provide a tinge of antiquity and is capable of sustaining heavy load exerted thereon. The hook member 12 includes, as shown in FIGS. 2 through 4, an enlarged head 12a and a hook 16 integral with the head 12a and extending downwardly from the head 12a so as to define therebetween a mouth 13 through which a link or like connecting device, not shown, is held on the hook 16. The head 12a includes a headed pin 15 to which the link connector 11 (FIG. 1) is rotatably connected. The head 12a further has a recess 17 opening to the mouth 13 for receiving therein a portion of the latch member 14. The recess 17 is defined by and between a pair of confronting side walls 18, 18, as shown in FIGS. 3 and 5. The side walls 18 have a pair of aligned holes 19, respectively, for pivotal connection with the latch member 14 as described later. The side walls 18 have a pair of confronting sloped guide surfaces 20, 20 facing the recess 17 and extending from one end of the side walls 18 toward the respective holes 19. The sloped guide surfaces 20 extend divergently away from the holes 19 for facilitating attachment of the latch member 14 to the hook member 12.

Figure 6:
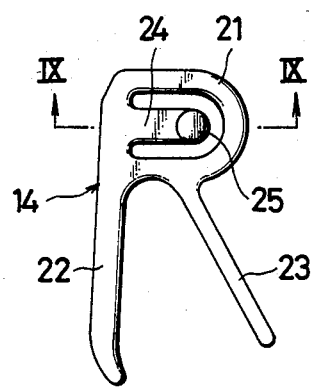
FIG. 6 is a front elevational view of a latch member of the safety hook shown in FIG. 1.
Figure 7:
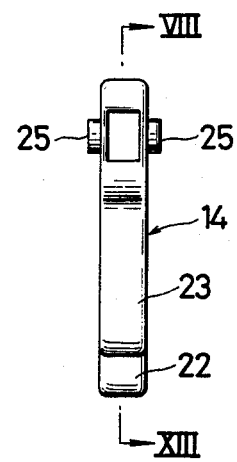
FIG. 7 is a right side view of FIG. 6.
Figure 8:
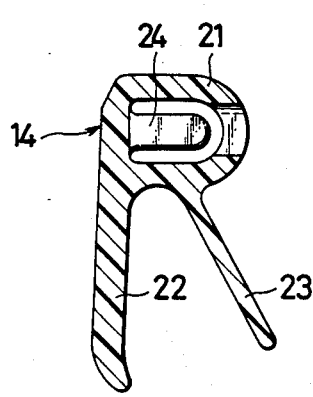
FIG. 8 is a cross-sectional view taken along line VIII—VIII of FIG. 7.
Figure 9:
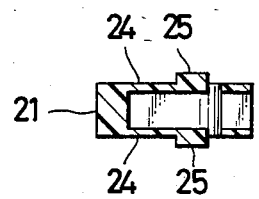
FIG. 9 is a cross-sectional view taken along line IX—IX of FIG. 6.

The latch member 14, as shown in FIGS. 1 and 6, has a generally R-shape and injection-molded of a synthetic resin. The R-shaped latch member 14 includes a rounded head 21 of a complete or closed ring shape, a locking arm 22 and a resilient arm 23 that are integral with the head 21 and extend outwardly from one side of the head 21 in diverging fashion. The resilient arm 23 is narrower than the locking arm 22 so that it has a certain degree of resiliency large enough to retain the latch member 14 in a closing position when the latch member 14 is assembled with the hook member 12. The ring-shaped head 21 is formed integrally with a pair of parallel spaced support lugs 24, 24 projecting into an opening in the ring-shaped head 21. The support lugs 24 extend from one side toward the opposite side of the ring-shaped head 21 and terminate short of the opposite side so that the thus cantilevered support lugs 24 are resiliently flexible when they are compressed together. As shown in FIG. 9, the cantilevered resilient support lugs 24 have on their distal ends a pair of aligned pivot pins 25, 25 extending outwardly away from one another. The pivot pins 25 are rotatably receivable in the respective holes 19 in the hook member 12 for assembling the latch member 14 and the hook member 12. The latch member 12 excluding the pivot pins 25 has a thickness which is sligthly smaller than the width of the recess 17 in the hook member 12. The pivot pins 25 have a length smaller than the length of the holes 19 so that they do not project from the outside surfaces of the side walls 18 when the latch member 14 is assembled with the hook member 12.

When the hook member 12 and the latch member 14 are to be assembled together, the latch member 14 is pushed into the recess 17 in the hook member 12 with the resilient arm 23 facing forwardly until the pivot pins 25 of the latch member 14 are in registry with the respective holes 19 in the hook member 12. In this instance, the pivot pins 25 are guidedly received in and then slid along the sloped guide surfaces 20 on the side walls 18. Since the sloped guide surfaces 20 converge toward the bottom of the recess 17, the support lugs 24 resiliently flex inwardly toward each other as the pivot pins 25 move inwardly of the recess 17. A further advancing movement of the latch member 14 causes the pivot pins 25 to be in registry with the respective holes 19 whereupon the pivot pins 25 are snap-fitted into the holes 19 as the the resilient support lugs 24 spring back to their unbent initial positions. The latch member 14 is thus pivotally connected to the hook member 12, as shown in FIG. 1. In this assembled condition, the resilient arm 23 engages the bottom wall of the recess 17 and resiliently urges the latch member 14 to turn clockwise about the pivot pins 25 in a closing position in which the locking arm 22 abuts against the inner side of a tip of the hook 16, thereby closing the mouth 13 of the hook member 12. The pivot pins 25 are fully received within the holes 19 so as not to project from the outside surfaces of the side walls 18 with the result that the latch member 14 and the hook member 12 can be retained in assembled condition even when a severe thrusting force is applied to the locking arm 22.

Figure 10:
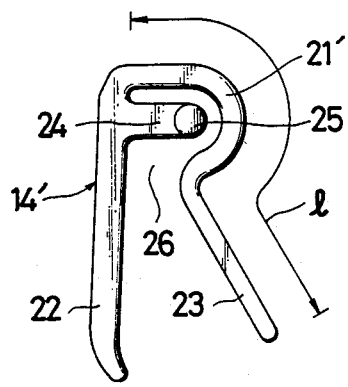
FIG. 10 is a front elevational view of a latch member according to another embodiment of the present invention.
Figure 11:
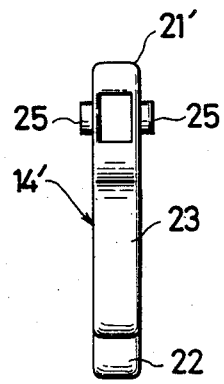
FIG. 11 is a right side view of FIG. 10.

FIGS. 10 and 11 show a modified generally R-shaped latch member 14' according to the present invention. The modified latch member 14' is substantially the same as the latch member 14 of the foregoing embodiment except that the rounded head 21' has a split ring shape defining a gap 26 at opposite ends thereof. One end of the split ring-shaped head 21' is joined with a locking arm 22 and the other end of the split ring-shaped head 21' is joined with a resilient arm 23. With this construction, the resilient arm 23 has an effective length l (FIG. 10) which is substantially equal to the overall length of a right half of the R-shaped latch member 14'. Since the right half of the R-shaped latch member 14' including the resilient arm 23 is resiliently deformable about an upper end thereof, the resilient arm 23 is free from damage or breakage as opposed to the resilient arm 23 of the latch member 14 shown in FIG. 6. In the case of the latch member 14, the resilient arm 21 may be broken due to stresses concentrated at the junction between the resilient arm 23 and the closed ring-shaped head 21. The elongated effective length of the resilient arm 23 makes it possible to use a relatively low resilient plastics material such as nylon for the formation of the latch member 14' with the result that the durability of the latch member 14' can be improved.

As described above, the safety hook of the present invention includes a generally R-shaped latch member molded of a synthetic resin and having a pair of pivot pins integrally formed with a pair of resilient support lugs, respectively. The latch member is movably received in a recess in a hook member and the pivot pins are rotatably received in holes in the hook member for pivotally connecting the latch member to the hook member. The safety hook can be easily assembled only by pushing the latch member into the recess in the hook member until the pivot pins are snap-fitted in the respective holes. Since the pivot pins are fully received within the holes and they do not project to the outside of the hook member, the latch member is held in position against detachment from the hook member once they are assembled.

Obviously, various modifications and variations of the present invention are possible in the light of the above teaching. It is therefore to be understood that within the scope of the appended claims the invention may be practiced otherwise than as specifically described.

What is claimed is:
1. A safety hook comprising:
 (a) a hook member having an enlarged head and a hook integral with and extending from said head so as to define therebetween a mouth, said enlarged head having a recess opening to said mouth and a pair of aligned holes communicating with said recess; and
 (b) a generally R-shaped latch member pivotally mounted on said hook member and including a rounded head movably received in said recess, a locking arm and a resilient arm which are integral with and extend outwardly from one side of said head in diverging fashion, said resilient arm acting on said hook member to urge said latch member in a closing position in which said locking arm closes said mouth, said head including a pair of spaced resilient support lugs and a pair of aligned pivot pins integral with the respective support lugs, said pivot pins extending outwardly away from one another and being rotatably received in said holes, respectively.

2. A safety hook according to claim 1, said pivot pins having a length smaller than the length of said holes.

3. A safety hook according to claim 1, said head of said hook member having a pair of spaced side walls defining therebetween said recess, said holes being formed in said side walls, respectively, said side walls having a pair of sloped guide surfaces facing said recess in confrontation to one another and extending from one end of said side walls (18) toward the respective holes, said sloped guide surfaces extending divergently outwardly away from said holes.

4. A safety hook according to claim 1, said rounded head having a generally ring shape, said resilient support lugs projecting into an opening in said ring-shaped head.

5. A safety hook according to claim 1, said rounded head having a closed ring shape.

6. A safety hook according to claim 1, said rounded head having a split ring shape, said resilient arm extending from one end of said split ring-shaped head, said locking arm extending from the opposite end of said split ring-shaped head.

7. A safety hook according to claim 1, said hook member being made of metal, said latch member being molded of synthetic resin.

* * * * *